(12) United States Patent
Yamamoto et al.

(10) Patent No.: US 8,935,224 B2
(45) Date of Patent: *Jan. 13, 2015

(54) FAILURE TOLERANT TRANSACTION PROCESSING SYSTEM

(75) Inventors: Gaku Yamamoto, Setagaya-ku (JP); Hideki Tai, Kanagawa-ken (JP); Hiroshi Horii, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 96 days.

This patent is subject to a terminal disclaimer.

(21) Appl. No.: 13/438,859

(22) Filed: Apr. 4, 2012

(65) Prior Publication Data

US 2012/0191681 A1 Jul. 26, 2012

Related U.S. Application Data

(60) Division of application No. 12/061,702, filed on Apr. 3, 2008, now Pat. No. 8,166,007, and a continuation of application No. 11/562,531, filed on Nov. 22, 2006, now Pat. No. 7,478,114.

(51) Int. Cl.
*G06F 17/30* (2006.01)
*G06F 9/46* (2006.01)
*G06F 11/14* (2006.01)
(Continued)

(52) U.S. Cl.
CPC ............ *G06F 9/466* (2013.01); *G06F 11/2023* (2013.01); *G06F 11/1474* (2013.01); *G06F 11/183* (2013.01)
USPC ........................................................ 707/703

(58) Field of Classification Search
USPC ......... 707/707, 706, 708, 709, 652, 703, 697, 707/698, 704
See application file for complete search history.

(56) References Cited

U.S. PATENT DOCUMENTS 6,275,832 B1 8/2001 Watts et al.
6,289,382 B1 * 9/2001 Bowman-Amuah .......... 709/226
(Continued)

FOREIGN PATENT DOCUMENTS

EP  0 457 112 A2  11/1991
EP  0 992 901 A2  4/2000
(Continued)

OTHER PUBLICATIONS

JP2007-547999, Japanese Notice of Allowance Communication, Nov. 23, 2011, 3 pages.
(Continued)

*Primary Examiner* — Ajay Bhatia
*Assistant Examiner* — Fatima Mina
(74) *Attorney, Agent, or Firm* — Gibb & Riley, LLC

(57) ABSTRACT

The present invention proposes a system for resending a process to a backup server farm from a client without waiting for the failure-detection, if no reply is received for a certain time. The transaction processing mechanism of the present invention has a transaction start processing mechanism in which an exclusive control using a valid processing authority token and data consistency are combined, and a commit processing mechanism in which determination on whether a commit is available or not based on a distributed agreement and replication of updated data. With the mechanisms, a system for shortening a service halt time when a failure occurs to a time as such it appears to a client that the service does not stop is provided.

6 Claims, 13 Drawing Sheets

(51) Int. Cl.
   *G06F 11/20*   (2006.01)
   *G06F 11/18*   (2006.01)

(56) References Cited

U.S. PATENT DOCUMENTS

| | | | |
|---|---|---|---|
| 6,691,165 | B1 | 2/2004 | Bruck et al. |
| 6,694,429 | B1 | 2/2004 | Kalmanek, Jr. et al. |
| 7,496,574 | B2 * | 2/2009 | Walker .................................. 1/1 |
| 7,526,672 | B2 | 4/2009 | Lin et al. |
| 2001/0042072 | A1 * | 11/2001 | Yahya et al. .................. 707/200 |
| 2001/0049717 | A1 * | 12/2001 | Freeman et al. .............. 709/203 |
| 2002/0108050 | A1 | 8/2002 | Raley et al. |
| 2003/0169445 | A1 | 9/2003 | Chu et al. |
| 2005/0149764 | A1 | 7/2005 | Bahl et al. |
| 2005/0172161 | A1 | 8/2005 | Cruz et al. |
| 2006/0294053 | A1 | 12/2006 | Kojima |

FOREIGN PATENT DOCUMENTS

| | | |
|---|---|---|
| GB | 2 335 516 A1 | 9/1999 |
| GB | 2 343 020 A2 | 4/2000 |
| GB | 2 409 544 A1 | 6/2005 |
| GB | 1 550 951 A2 | 7/2005 |
| JP | 2004-110790 A | 4/2004 |
| JP | 2004-348701 A | 12/2004 |
| JP | 2005-27618 A | 10/2005 |

OTHER PUBLICATIONS

U.S. Appl. No. 12/061,702, Notice of Allowance Communication, Dec. 20, 2011, 11 pages.
U.S. Appl. No. 12/061,702, Notice of Allowance Communication, Sep. 2, 2011, 11 pages.
Gray, et al., "Consensus on Transaction Commit," Microsoft Research MSR-TR-2003-96, Microsoft, Feb. 21, 2005, pp. 5-6.
Office Action Communication, Jul. 19, 2011, 2 pages.
U.S. Appl. No. 12/061,702, Advisory Action Communication, Jul. 27, 2011, 3 pages.
U.S. Appl. No. 12/061,702, Office Action Communication, May 13, 2011, 20 pages.
U.S. Appl. No. 12/061,702, Office Action Communication, Nov. 15, 2010, 41 pages.
European Search Report, Appln No. 06833749.2-1243/1959347, Dec. 22, 2009, pp. 1-12.
Leslie Lamport, "Generalized Consensu and Paxos," Micorsoft Research Technical Report MSR-TR-2005-33, Mar. 3, 2004, pp. 1-63.
M. Wiesmann, et al., "Understanding Replication in Databases and Distributed Systems," Proceedings of the 20th International Conference on Distributed Computing Systems, 2000, pp. 264-274.
S. Banerjee, et al., "A New Token Passing Distributed Mutual Exclusion Algorithm," In the Proceedings of the International Conference on Distributed Computing Systems (ICDCS), 1996, pp. 1-8.
U.S. Appl. No. 11/562,531, Notice of Allowance Communication, Sep. 5, 2008, 13 pages.

\* cited by examiner

FAILURE TOLERANT TRANSACTION PROCESSING SYSTEM

CROSS-REFERENCE TO RELATED APPLICATIONS

This application is a Divisional of U.S. application Ser. No. 12/061,702 filed Apr. 3, 2008, issued as U.S. Pat. No. 8,166,007 issued Apr. 24, 2012, which is a Continuation of U.S. Pat. No. 7,478,114 issued Jan. 13, 2009, the complete disclosure of which, in its entirety, is herein incorporated by reference.

BACKGROUND OF THE INVENTION

1. Field of the Invention

The present invention relates to a failure tolerant transaction processing system. More specifically, the present invention relates to a transaction processing method, a processing system and a control program for constructing a failure tolerant transaction system.

2. Background Art

Modern business application systems have a problem in that a transaction process temporally stops due to a system failure in a server or the like. Therefore, for example, Patent Document 1 discloses a method and a system for diagnosing and performing self-repair the server failure in a server farm (a set of a group of servers).

[Patent Document 1] Published Unexamined Patent Application No. 2004-110790

From the viewpoint of a user of the system, it does not matter if only a transaction process completes within a time period near that of the normal occasion (two or three seconds in many systems) even if a system failure occurs. In a general system, it is difficult to have a down time finished within the abovementioned time period.

A failure tolerant mechanism of the modern business application system is based on failure-detection and take-over-processing. That is to say, a method for instantaneously switching in response to detection of a failure is adopted. The failure-detection, however, generally requires ten seconds to a few minutes. This is because the failure-detection is performed by determining whether message exchange between an external computer and an objective server by communication jams up or not.

Even if the objective server is normally operating, however, the load temporally becomes high and message exchange may jam up. Therefore, if message exchange is attempted several times in a certain time period but the message exchange cannot be performed normally, it is determined that a failure occurs in the objective server. If the reply waiting time or the number of attempts is set too small, the failure detection mechanism determines that a failure occurs without regard of normal operation of the objective server, and starts the take-over-processing at a backup server. As a result, at least about ten seconds are reserved for checking whether it is alive or not.

As such, the failure-detection and the take-over-processing cannot be performed in a time period too short for a user to recognize the system failure. That is essential to the failure-detection. In order to shorten a time period for checking whether it is alive or not, a network dedicated for message processing of checking whether it is alive or not needs to be prepared, and a processor dedicated for checking whether it is alive or not at the objective server further needs to be prepared, and a mechanism for checking whether an operating system and processes thereon are normally operating or not is needed.

That requires hardware and the operating system to be changed, but the current open platform environment cannot meet the requirements.

Therefore, the present invention is adapted to solve the abovementioned problems, and intends to provide a new transaction processing method for enabling a process to be resent to a backup system without waiting for failure-detection of a system, if no reply is received for a certain time period.

In the present invention, conditions below are mainly assumed.

(2F+1) sets comprising a data management mechanism and one or more servers for updating data in the mechanism (hereinafter the set is referred to as a server farm) are present ("F" is a natural number). A client for issuing a transaction request to the server farm sets is present. Between respective server farms and between a client and each of the server farms are connected via a network with a plurality of data sending channels which is made redundant (multiplexed). The same transaction request can be inputted from a single client for multiple times. If the client cannot receive a reply from a server farm for a certain time period, it sends the same transaction request to another server farm. A network and a server farm may encounter a malfunction at any time, but there are only F sets of server farms that encounter a malfunction caused by a failure.

FIG. 1 shows a basic form of a system assumed by the present invention (corresponds to a case of F=1).

As shown, each of the server farms 1-3 has a plurality of application servers (1c-3c), with a database (DB1a, 2a, 3a) and a DB server for managing each of the DBs (1b, 2b, 3b) being present in each server farm. Clients 4, 5 requesting a transaction access a database needed by the transaction via the application servers and the DB server in each of the server farms.

FIG. 2 shows the minimum configuration assumed by the present invention. An arbiter 8 in the figure is a special form of a server farm, and is a server farm only for normally operating the other server farms, neither performing a transaction process nor having a DB. For example, even if F=1, the present invention has many cases of needing three server farms but not needing to make a DBMS (Data Base Management System) triple. As the present invention has a distributed agreement protocol based on a majority rule as basis, it needs a server to perform voting for a majority rule also in a dual-redundant case. It is the arbiter 8 which does that.

Although the server farm will be described with (2F+1) sets (odd-numbered sets) as basis below, it can be applied to a system of 2F sets (even-numbered sets) of server farms by including the arbiter 8 in a configuration like that.

The problems of the present invention are to ensure three points below under such conditions.

<Problem 1> Even if the same transaction is redundantly executed for a plurality of numbers of times, only one execution succeeds a commit (completes a commit).

<Problem 2> A transaction which completed a commit is executed based on the latest data.

<Problem 3> If a server farm stops due to a failure, the transaction processes can be continued without being stopped for a long time.

SUMMARY OF THE INVENTION

In order to solve the problems, a first embodiment of the present invention provides processing methods below.

(1) A method for processing steps below in a transaction starting process.

Step 1: In a transaction starting process, the ID of an objective transaction is referenced, and whether a transaction with the same ID is being executed or completed a commit is checked, and if it is being executed or completed a commit, the objective transaction is rolled back (canceled).

Step 2: Further in the transaction starting process, whether the self server farm keeps a processing authority token (time-limited token) whose valid period is expired or not is checked; and if it does not keep the token, an acquisition process of the processing authority token is performed by using an "exclusive control technique using the processing authority token in a group of 2F+1 servers" and the completion of the acquisition is waited for.

Step 3: Further, if the acquisition process of the processing authority token is performed, the self server farm keeps the latest data among all server farms in a system by using a "technique for taking data consistency in a group of 2F+1 servers" at the same time as or immediately after the process.

Here, the "exclusive control technique using the processing authority token in a group of 2F+1 servers" and the "technique for taking data consistency in a group of 2F+1 servers" use publicly known techniques to be described later.

A method for further processing the step of (2) in addition to the process of (1).

2) The processing flow below is executed in a commit process of a transaction.

Step 1: In a commit process, the transaction ID of an objective transaction, data updated by the transaction and a processing result to be returned to that is requesting the transaction are transferred to all server farms, and copies to at least F+1 servers are checked by using a "replication technique of updated data in a group of 2F+1 servers".

Step 2: Further, if the step 1 succeeded, a commit request message is sent to all the other servers and if a commit agreement is received from at least F+1 servers, it makes the commit success by using a "technique for determining whether a commit is available or not based on a distributed agreement in a group of 2F+1 servers".

Step 3: Further, that a commit is established is informed of to all server farms.

Here, the "replication technique of updated data in a group of 2F+1 servers" and the "technique for determining whether a commit is available or not based on a distributed agreement in a group of 2F+1 servers" use publicly known techniques to be described later.

(1) and (2) indicate main processes of the present invention and further include methods below as additional processes.

(2) A process of not replying to a commit request message until a processing authority token acquisition process completes or replying a request to resend a commit request message, if a commit request message is received while the processing authority token acquisition process is being processed.

(3) A process of not replying to a processing authority token acquisition message until a commit is established or returning a request to resend the processing authority token acquisition message, if the processing authority token acquisition message is received between when a commit request message is sent to another server farm and when the commit is established in response to the reply.

(4) A process of receiving logs of unresolved transactions from the other servers and bringing a state of the transaction logs synchronized before the processing authority token acquisition completes.

(5) If transaction information with a commit unknown is included in a message in a receiving process of the processing authority token acquisition message and a receiving process of a reply message, a process of referencing the information; and if a commit or rollback of the transaction has been established, returning the result, and if it has not been established, establishing a commit by the method of (2).

(6) A commit request approval process of determining whether a valid processing authority token is kept in those other than that sent the message or not as a receiving process of a commit request message of a transaction; and if it is kept, returning a rejection to the commit request; and if it is not kept, returning approval.

(7) A resending/token valid period setting process for calculating a resending interval of a transaction of a client which sends a transaction processing request and a valid period of a token set by the "exclusive control technique using the processing authority token in a group of 2F+1 servers" from an estimated value of a response time of a transaction process, and setting it at a client side.

Although the embodiment of solving means of the present invention has been described as a transaction processing method, it can be realized by a processing device with the same functions, a processing mechanism (processing system), and a computer program for controlling that as the other embodiments.

The present invention proposes a system for resending a process from a client to a backup server farm without waiting for failure detection if no reply is received in a certain time period. That is to say, a transaction process of the present invention has a transaction starting process in which an excluding control using the processing authority token and data consistency are combined and a commit process in which determination on whether the commit is available or not based on a distributed agreement and replication of updated data are combined. With the processes, a service stop time due to a failure occurred to an application server, a DBMS (Data Base Management System) and a network can be made shorter than that in the conventional art, and a system which can continue a service without letting a client recognize occurrence of the failure can be constructed.

DETAILED DESCRIPTION OF EMBODIMENTS

Figure 1:
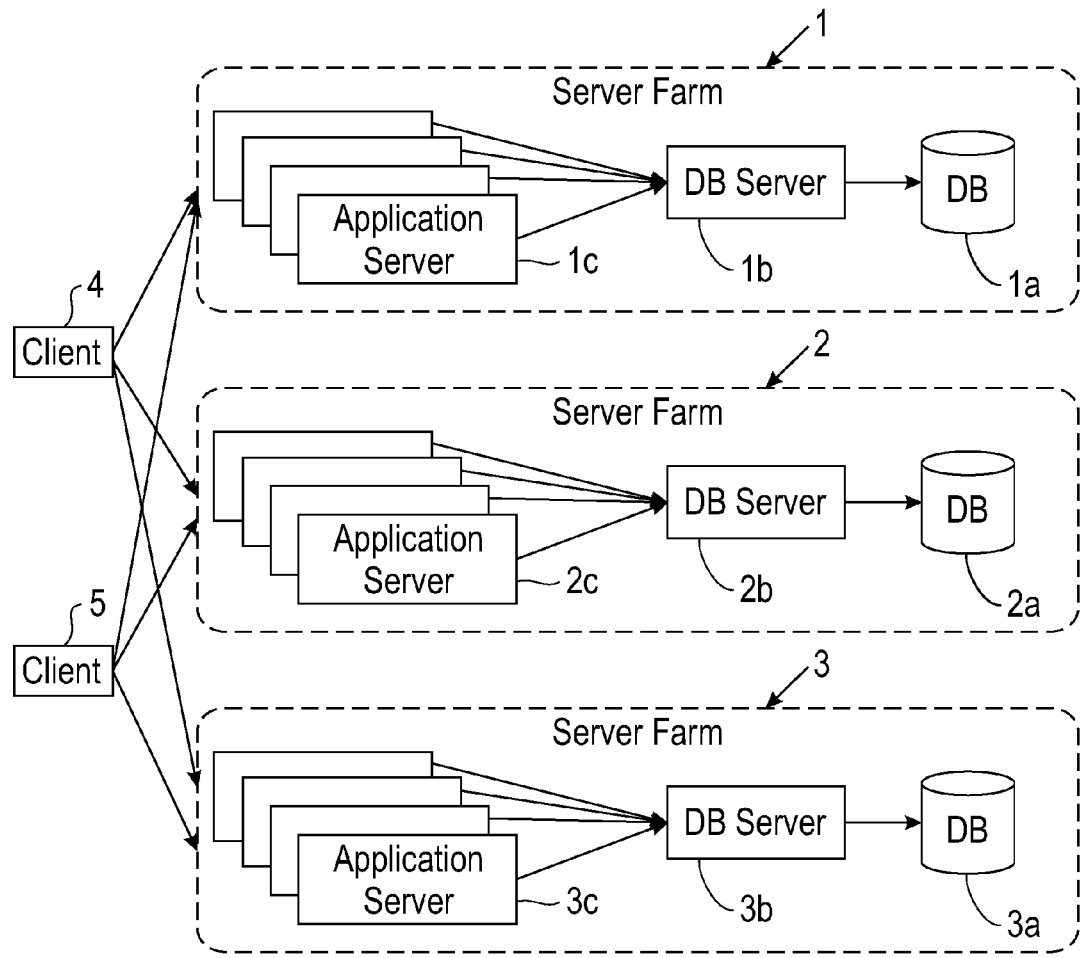
FIG. 1 is a diagram showing a basic form of a transaction processing system.
Figure 2:
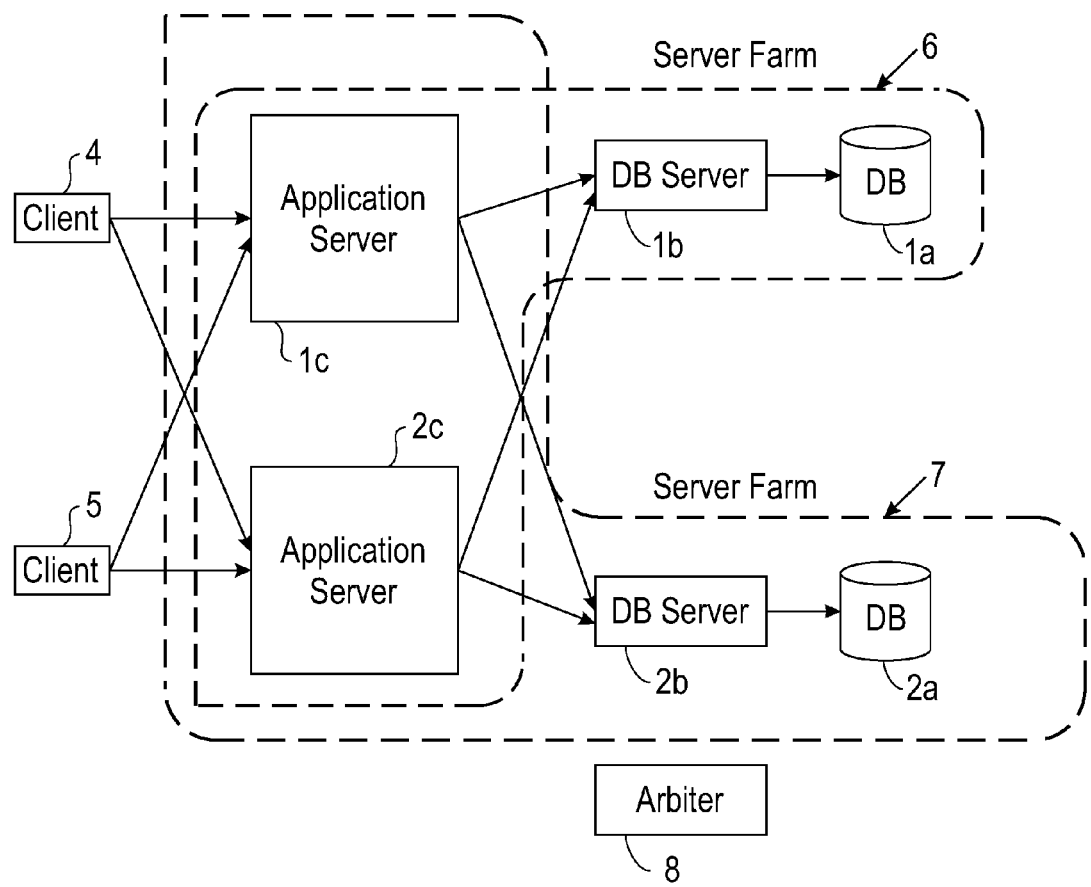
FIG. 2 is a diagram showing the minimum configuration of a transaction processing system.

The present invention provides a transaction process which solves the abovementioned three problems at the same time, ensures that a commit of a transaction is performed at a single server farm by all means and further ensures that a transaction which succeeds a commit is always performed on the latest data. A basic principle of the present invention will be described below.

<A Technique for Solving the Problem 1>

In order to prevent that a transaction is redundantly processed in a plurality of server farms, a "processing authority token" based on a Mutual Exclusion technique proposed in the documents listed below 1-3 is used.

1) Suzuki, I, Kasami, T, A distributed mutual exclusion algorithm, ACM Transactions on Computer Systems (TOCS), v. 3, n. 4, p. 344-349, November 1985.
2) Nishio, S., Li, K. F., Manning, E. G., A resilient mutual exclusion algorithm for computer networks, IEEE Transactions on Parallel and Distributed Systems, v. 1 n. 3, p. 344-355, July 1990.
3) Banerjee, S.; Chrysanthis, P. K., A new token passing distributed mutual exclusion algorithm, Proceedings of the 16th International Conference on Distributed Computing Systems, 1996., p. 717-724, May 1996.

The Mutual Exclusion technique is a generalized technique by which only one server is allowed to keep a token among a plurality of groups of servers (server farms). The present invention causes only one server farm with a valid processing authority token to be present in 2F+1 server farms at a certain time by using the technique. If it has a valid processing authority token in processing a commit of a server farm, the server farm attempts to acquire the processing authority token again; and if the server farm does not acquire it, it rolls back the transaction. An expiration time is set to the processing authority token. When the expiration time is expired, the processing authority token becomes invalid, allowing the other server farms to acquire a processing authority token anew. In a typical example, a valid period of the processing authority token is set about one second to shorten the down time of the system due to a failure. The valid period of the processing authority token can be extended, however.

<A Technique for Solving the Problem 2>

The present invention uses a data replication technique for copying data to F or more servers in a group of 2F+1 servers (as the self server farm also has data, a majority of, i.e., F+1 or more server farms have data in all) as well as a data consistency technique for dealing data included in a group of F+1 or more servers in a group of 2F+1 servers as agreed data in a group of 2F+1 servers. The techniques are well known generalized techniques (Documents 4, 5).

4) J. Gray and A. Reuter, Transaction Processing Concepts and Techniques, Mogan Kaufmann
5) M. Wiesmann, F. Pedone, A. Schiper, B. Kemme, and G. Alonso Understanding replication in databases and distributed systems. In Proceedings of $20^{th}$ International Conference on Distributed Computing Systems [ICDCS' 2000], p. 264-274, April 2000.

<A Technique for Solving the Problem 3>

In a commit process of a transaction, Two-Phase Commit Protocol is well-known, which is also known as a Blocking protocol. The Blocking protocol is such that a commit of a transaction becomes unestablished when a coordinator, which performs a commit process of the transaction, stops due to a failure, and the commit process of the transaction cannot be established until the decided result of the coordinator is acquired. Therefore, the protocol cannot solve the problem 3. J. Gray and others propose a Paxos commit protocol (Document 7), in which a Paxos consensus protocol (Document 6) for taking an agreement in a group of 2F+1 servers proposed by L. Lamport and others is applied to the commit process as a technique to solve the problem. The protocol is such that the commit process can be achieved without being blocked if only F+1 or more servers are normally operating in a group of 2F+1 servers. The present invention uses the Paxos commit as a commit process technique for solving the problem 3.

6) L. Lamport, Generalized Consensus and Paxos, Microsoft Research Technical Report MSR-TR-2005-33
7) J. Gray and L. Lamport, Consensus on Transaction Commit, MSR-TR-2003-96)

<Solution for all the Problems 1 to 3>

The problems 1, 2 and 3 have techniques to solve them respectively. In the present invention, however, all the three problems need to be solved at the same time. If each of the solving methods for the problems 1 to 3 is used solely, all the problems 1 to 3 cannot be solved at the same time. For example, the Mutual Exclusion for solving the problem 1 can prevent redundant processing of the same transaction but cannot ensure that the transaction process for which a commit is performed on is performed on the latest data set in a group of 2F+1 servers. The data replication technique and the data consistency technique for solving the problem 2 cannot prevent redundant processing of the same transaction. The Paxos commit for solving the problem 3 can neither solve redundant processing of the same transaction nor ensure that the commit process is performed on the latest data set in a group of 2F+1 servers. Therefore, the techniques for solving respective problems 1 to 3 need to be appropriately merged and an algorithm needs to be reconstructed so as to solve all the problems 1 to 3 at the same time.

In the transaction processing mechanism of the present invention, a checking process is performed on the processing authority token for preventing redundant processing of a transaction when the transaction starts. If it is included, the starting process of the transaction is completed. A server farm which does not have it performs both of the processing authority token acquisition process and the data consistency process.

The processing authority token acquisition process is performed by a method shown in the Mutual Exclusion. If it is failed (if it is acquired by another server farm), that fails the starting process of the transaction. In the Mutual Exclusion, the token can be acquired, if an agreement can be acquired from F+1 server farms for a processing authority token acquisition request.

Therefore, the number of server farms which can acquire the processing authority token at 2F+1 server farms is only one. When only F server farms (for example, DB servers in a server farms) stop, acquisition of the processing authority token can be performed. The processing authority token is typically given by an application; but strictly speaking, it is given to a data set which is accessed by a certain set of transactions wherein a transaction other than the set of transactions does not access the data set and any transaction in the set of transactions does not access data other than the data set.

Next, a process for verifying whether the server farm which acquires the processing authority token has the latest data or not to make the transaction performed on latest data at acquiring the processing authority token; and if the server farm does not have that, a process of acquiring a transaction log indicating a difference of data from another server farm is performed. In the present invention, if a transaction log can be copied to the F+1 server farms, a commit can be succeeded. Accordingly, in a set of transaction logs included in the F+1 server farms in the 2F+1 server farms, the latest transaction log is present. Here, by giving serial numbers of the LSN (Log Serial Number) to the transaction log, the transaction log which is not included by the server farm which acquired the processing authority token can be known, and searched for and acquired from a group of server farms.

In the commit process of the transaction, a data replication process and a commit establishing process are performed.

First, in the data replication process, a transaction log is copied so that the F+1 or more server farms have the transaction log. The transaction log is transferred to all the server farms alive and an acknowledgement message is waited to be received from the F server farms.

Next, an establishing process of a commit is performed by the Paxos commit The server farm which is performing a commit process sends a "Prepare" message to all the other server farms alive.

When each of the server farms received the message judges that those other than the sending server farm have the processing authority token, the server sends the decided result to all the modules called an accepter of itself by making it "Abort"; and if otherwise, by making it "Prepared". Here, an acceptor is a server which only has the decided result to a commit of a server farm, and 2F+1 acceptors are prepared for a server farm. The acceptor which received the decided result of the server farm sends the result to a server farm which is performing a commit process. When the server farm receives the decided result from the F+1 or more acceptors in the acceptors of a server farm, it deals it as the decided result of the server farm.

Figure 3:
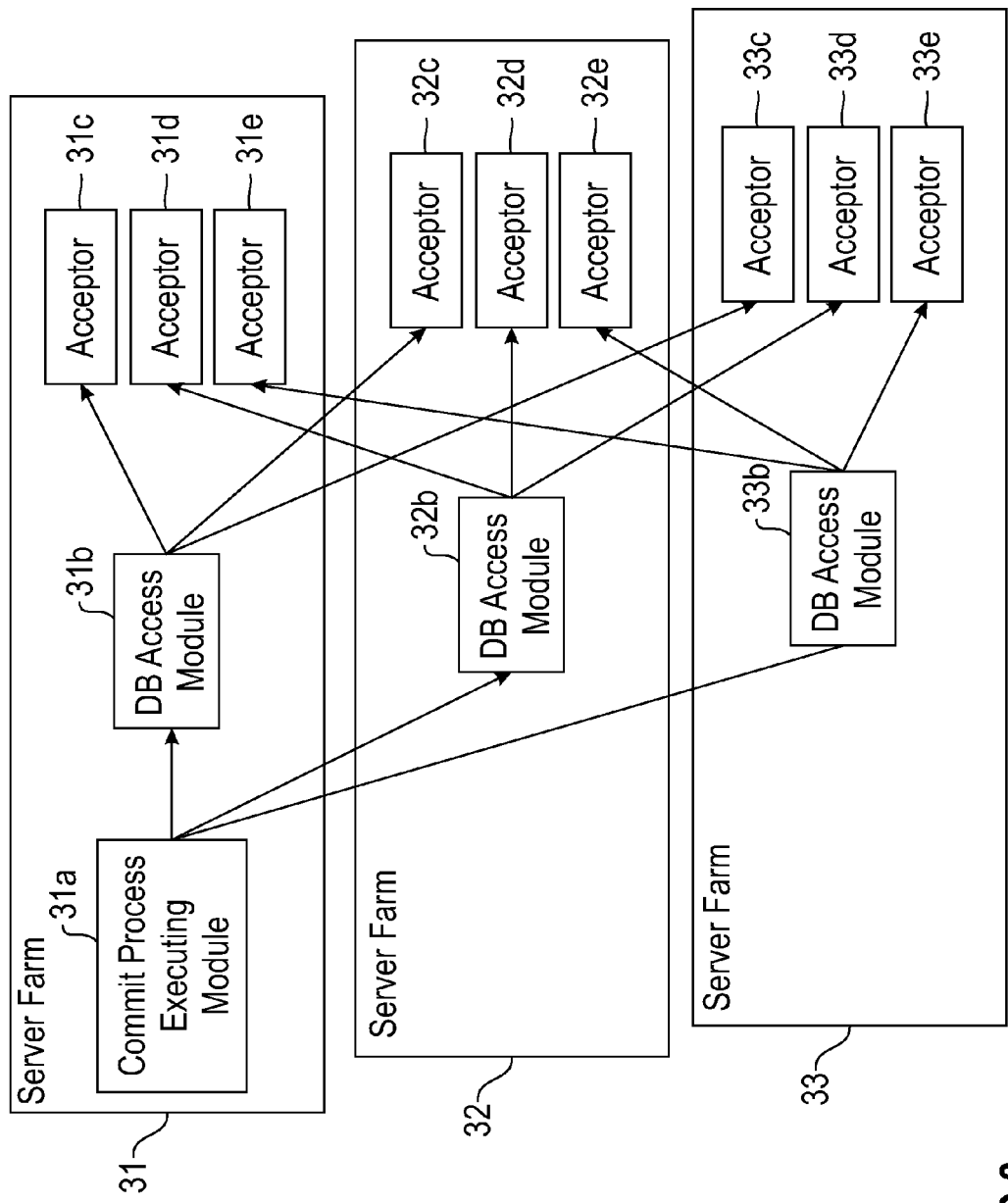
FIG. 3 is a diagram showing a configuration example of a Paxos commit in the case of F=1.

FIG. 3 shows a configuration example of the Paxos commit in the case of F=1 of the present invention. In FIG. 3, arrows from the acceptors to the commit process executing modules are omitted.

Here, each of the modules (31a, 31b, 32a, 33b) and acceptors (31c, 31d, 31e, 32c, 32d, 32e, 33c, 33d, 33e) in a server farm may be placed in the same server device or may be placed in different server devices.

Here, although the processing authority token acquisition, the introducing of data consistency, data replication, commit establishment have been described separately, as message exchange is actually performed by each of the processes, the number of messages may increase and performance may decrease. By considering that the processing authority token acquisition and the data consistency are performed in the transaction starting process, that the data replication and the commit establishment are performed in a commit process, and that all the processes are based on a distributed agreement protocol for acquiring an agreement from the F+1 server farms among the 2F+1 server farms, an outgoing message and an incoming message for the processing authority token acquisition process and the data consistency of the transaction starting process can be merged into a single message, and an outgoing message and an incoming message for the data replication and the commit establishment of the commit process can be merged into a single message, so that performance can be prevented from being decreased as the number of messages increases. Merging of such messages is generally performed.

A series of processes cannot be functioned as the techniques for the problems 1 to 3 are merely merged. The problem occurs when a server farm starts a transaction and an expiration time of the processing authority token is expired before it performs the commit process. In such a case, another server farm can acquire the processing authority token.

It is assumed that a server farm 1 has the processing authority token and starts a commit process of the transaction A, but the expiration time of the processing authority token is expired before the commit process of the transaction A completes. In such a case, another server farm 2 can acquire the processing authority token, execute a new transaction B and start a commit process. Here, if the transactions A and B succeed a commit, data consistency will be inconsistent.

As a commit has not been established for data updated by the transaction A, it is not reflected to a server farm 2. Therefore, the transaction B is performed on a data set before the transaction A is performed on. Here, if the transaction B commits and a commit of the transaction A completes immediately after that, a result of the transaction B may be lost. To prevent that, either that a transaction which is being processed in the server farm 1 is established or that a transaction which is being processed in the server farm 1 is rolled back is required at a time when the server farm 2 acquires the processing authority token.

In the present invention, in order to ensure them, solving techniques for respective problems 1 to 3 are merged.

In the present invention, setting of timeout duration for a client to wait for a replied result from a server and an expiration time of the processing authority token is important. If an expiration time of the processing authority token of a primary server farm has been expired when a client resend a transaction processing request to a backup server farm, it is more efficient than the case otherwise, as an acquisition of the backup processing authority token is immediately performed. To the contrary, if an expiration time of the processing authority token is longer than timeout duration until resending of the client, acquisition of the processing authority token is not succeeded at the backup server farm, thus, the client resends the request to the next backup server farm. In such a case, at the moment when an expiration time of the processing authority token is expired, a plurality of server farms attempt to acquire the processing authority token at the same time, competing against each other, so that any server farm cannot acquire the processing authority token. Timeout duration until resending of the client and the expiration time of the processing authority token need to be decided by taking that circumstances into consideration and further taking an average processing time of a transaction and the maximum waiting time into consideration.

System Configuration and a Place of the Proposing Mechanism>

Figure 4:
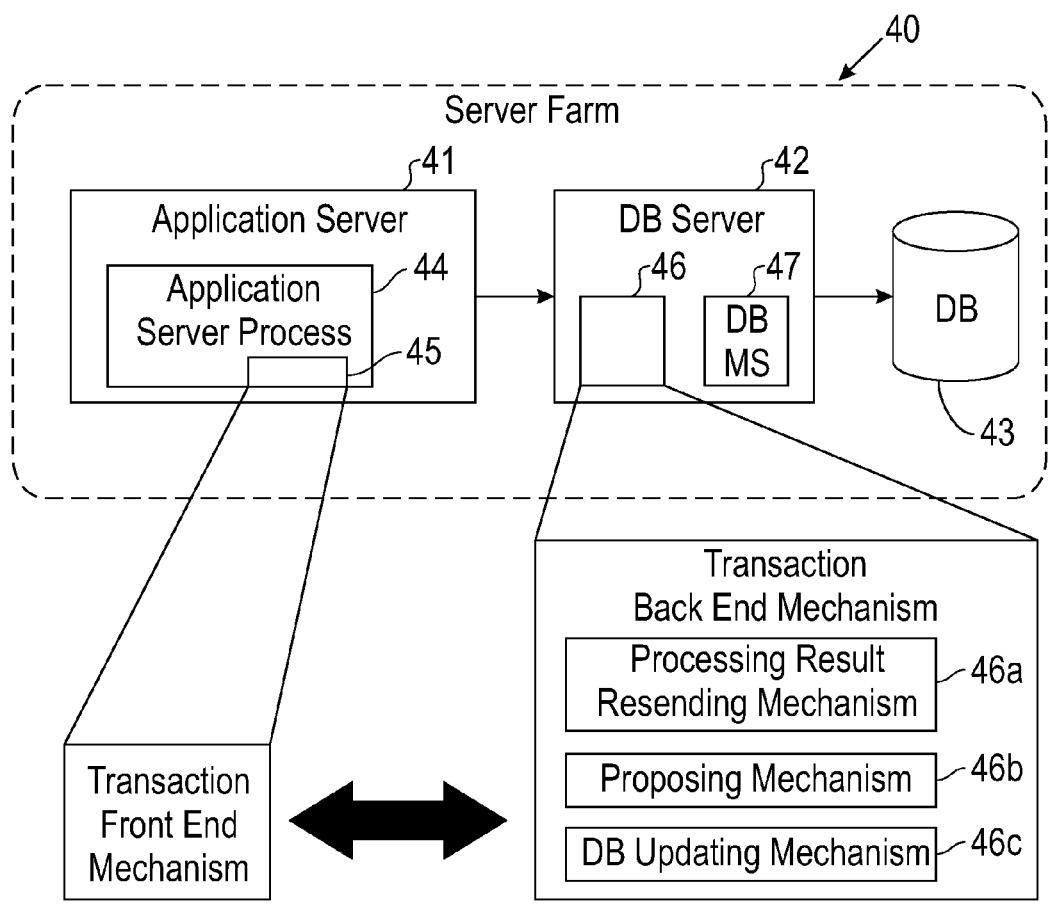
FIG. 4 is a diagram showing a system configuration according to an embodiment of the present invention and an example of a place of a proposing mechanism.

FIG. 4 shows an example of an entire system and a mechanism proposed by the present invention. Here, a case where a proposing mechanism 46b is placed in a DB server 42 in a server farm 40 is shown. The place of the proposing mechanism 46b is not limited to that.

The transaction processing mechanism of the present invention comprises a transaction front end mechanism 45 in an application server 41 (hereinafter described as a transaction Fr mechanism), and a transaction back end mechanism 46 in a DB server 42 (hereinafter described as a transaction Bk mechanism).

The transaction Fr mechanism accumulates a transaction log generated by business application logic for each transaction, and transfers the accumulated transaction logs to the transaction Bk mechanism in a commit process of the transaction Fr mechanism. Here, the proposing mechanism 46b of the present invention is called and whether it is a commit success or a commit failure is determined. Next, if it is commit success, the transaction Bk mechanism updates a DB 43 via a DBMS 47 by using the transaction logs. Next, it returns the commit result to the transaction Fr mechanism and the commit process of the application ends. Here, it needs not to be two-phase commit between the transaction Fr mechanism and the transaction Bk mechanism.

If a failure occurs in the DB server 42 and updating failed when the DB 43 is updated after the proposing mechanism 46b decided a commit success in the transaction Bk mechanism, the server farm becomes breakdown and the commit process of the application is in an incomplete state (whether a commit success or failure is unknown), but the transaction logs are transferred to another server farm by the proposing mechanism 46b and updated to the DB 43 at the server farm. Therefore, the client only needs to resend a transaction processing request. Here, if the transaction logs keep histories of data updating and a transaction processing result to be returned to the client, and the client resends the transaction processing request and the transaction has been succeeded a commit, processes for acquiring the processing result from the corresponding transaction log and resending it is needed.

A mechanism including the processing result of the transaction in a transaction log and a mechanism for retrieving the transaction processing result from a transaction log and resending it in resending a transaction processing request from the client are not subjects of the present invention, thus, description of them will be omitted.

Alternative methods of the present invention will be studied below.

<Method by Failure Detection>

The current mainstream method is a method of performing failure-detection and take-over processing. As mentioned above, the method requires at least ten seconds in failure-detection, thus, it cannot hide a failure from a client.

<Method by Multiprocessing>

This is a method of causing a plurality of servers to perform the same process, comparing the results by a majority rule and make the result with the most votes the entire result. That is used in a system which is required of high reliability such as in an airplane. If the method is introduced to the transaction processing system, however, a big problem occurs in performance as shown below.

In the method, if a plurality of transaction processing requests depending on each other arrive almost at the same time; data owned by all the data management mechanisms are not the same unless the requests are processed in the same order in all the servers. For example, it is assumed that two transaction processing requests A and B are present. The processes of A and B are assumed to be "if data X is 0, make X 1, and if data X is other than 0, nothing is done", "if data X is 1, make X 10, and if data X is other than 1, nothing is done", respectively. Here, it is assumed a case where at the server farm 1, the processes are performed in the order of A and B, and at the server farm 2, the processes are performed in the order of B and A. First, data X is assumed to be 0 at both of the server farms. At the server farm 1, as the processes are performed in the order of A and B, the value of X becomes 10; but at the server farm 2, the processes are performed in the order of B and A, the value of X becomes 1. It cannot be accepted that different results are kept in respective server farms.

Actually, transactions depending on each other or transactions with no relationship with each other are mixed, and at the stage where a transaction processing request is arrived, which transaction the transaction is in dependence is unknown. Therefore, all the transaction processing requests need to be processed in the same order at all the servers. To perform that, all the servers are synchronized with each other and checked for the order, each time a transaction processing request arrives. Further, as transactions need to be processed in the order which is synchronized at all the servers at each server, all the transaction processes are processed one by one in the order. That drastically decreases throughput of the transaction processes.

Figure 5:
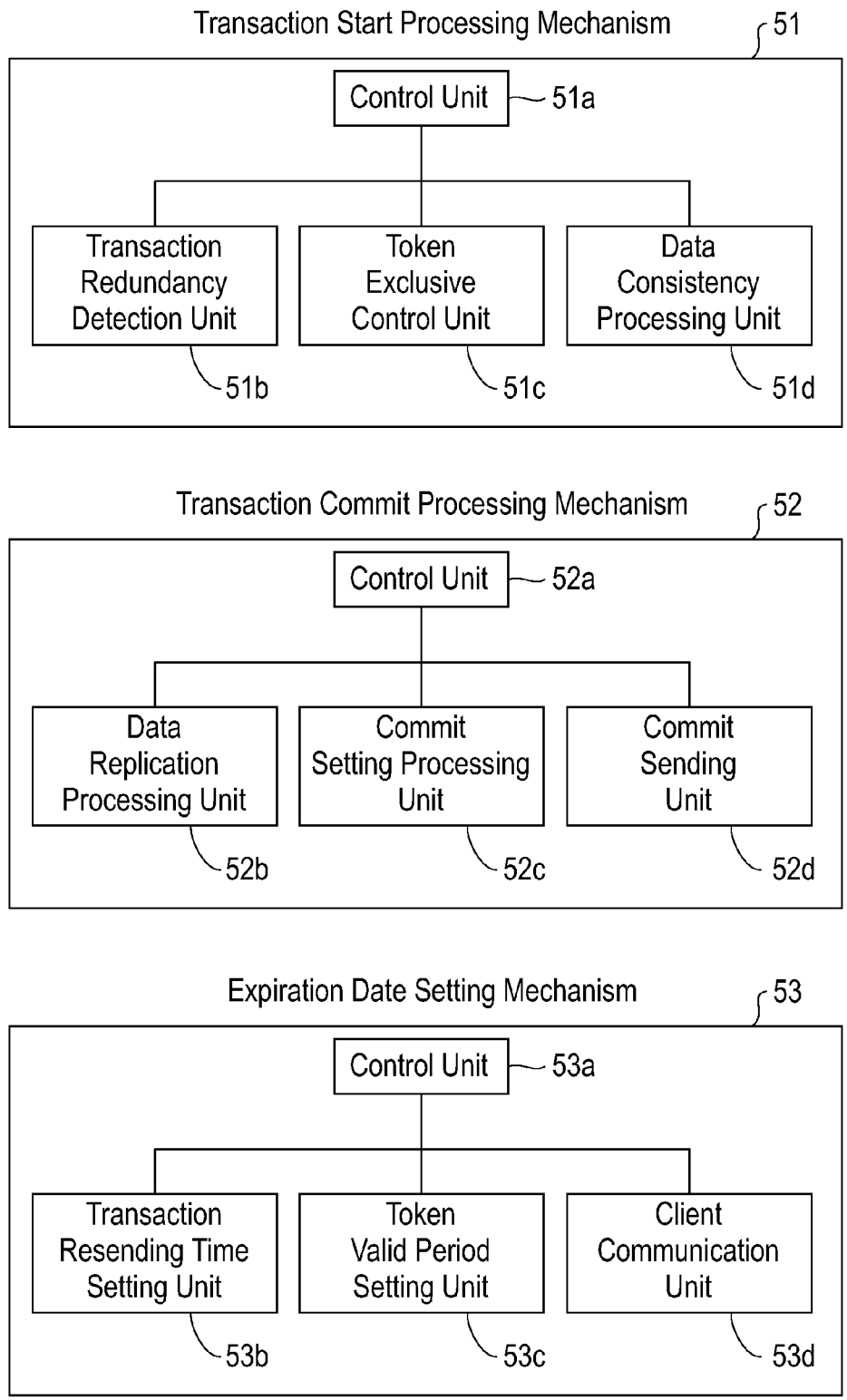
FIG. 5 is a diagram showing a transaction processing system according to an embodiment of the present invention.

FIG. 5 shows an outline of a transaction processing system (processing mechanism) as an embodiment of the present invention.

A transaction processing system 50 is a processing mechanism mainly lying astride a DB server and application servers in a server farm. The transaction processing system 50 is functionally divided into a transaction start processing mechanism 51, a transaction commit processing mechanism 52, and a valid period setting mechanism 53 as shown in the figure. The valid period setting mechanism 53 includes a mechanism for causing a client or an application server to perform the setting.

First, the transaction start processing mechanism 51 includes a control unit 51a, a transaction redundancy detection unit 51b, a token exclusive control unit 51c, and a data consistency processing unit 51d.

In a transaction starting process, the transaction redundancy detection unit 51b references the ID of an objective transaction, checks whether a transaction with the same ID is being executed or has completed a commit; and if it is being executed or has completed a commit, it returns rollback to the transaction starting process.

In a transaction starting process, the token exclusive control unit 51c checks whether the self server farm keeps the processing authority token whose valid period has not been expired (a time-limited token) or not, and if the server does not keep the token, it performs the exclusive control on the processing authority token such as to perform an acquisition process of the processing authority token and wait until the acquisition completes.

When the data consistency processing unit 51d performs the abovementioned acquisition process of the processing authority token, it controls the data consistency for the self server farm to keep the latest data among all server farms in the system at the same time as or immediately after the process.

Next, the transaction commit processing mechanism 52 includes a data replication processing unit 52b, a commit establishing processing unit 52c and a commit sending unit 52d.

The data replication processing unit 52b transfers the transaction ID of an objective transaction, the data updated by the transaction and the processing result to be sent to that requesting the transaction to all server farms, performs a process for checking copies to at least F+1 servers and manages a replicating process to each database.

If a copy to a database by the data replication processing unit 52b succeeded, the commit establishing processing unit 52c sends a commit request message to all the other servers, and when it receives a commit agreement from at least F+1 servers, it controls the process to make it a commit success.

Further, the commit sending unit 52d sends that the commit is established to all the other servers farms.

Further, the valid period setting mechanism 53 includes a control unit 53a, a transaction resending time setting unit 53b, a token valid period setting unit 53c, and a client communication unit 53d. The transaction resending time setting unit 53b is a mechanism for causing a client viewed from a DB server (an application server or a client terminal) to set a resending time (the maximum waiting time) of the transaction. For example, it may be adapted to send a setting screen to cause each client device to store a resending time when a system is configured.

The token valid period setting unit 53c is a mechanism for setting an expiration time of the processing authority token used in each server farm in a system. That is to say, it provides means for setting an expiration time of a token on the basis of a given transaction resending time. For example, it may be adapted to let an administrator to input the token expiration time as a parameter on a system configuration setting screen, and check whether the inputted parameter is appropriate for the transaction resending time or not. An example of the parameters of the setting time will be described later.

The abovementioned processing mechanism is just an example and the present invention is not limited to the configuration.

Figure 6:
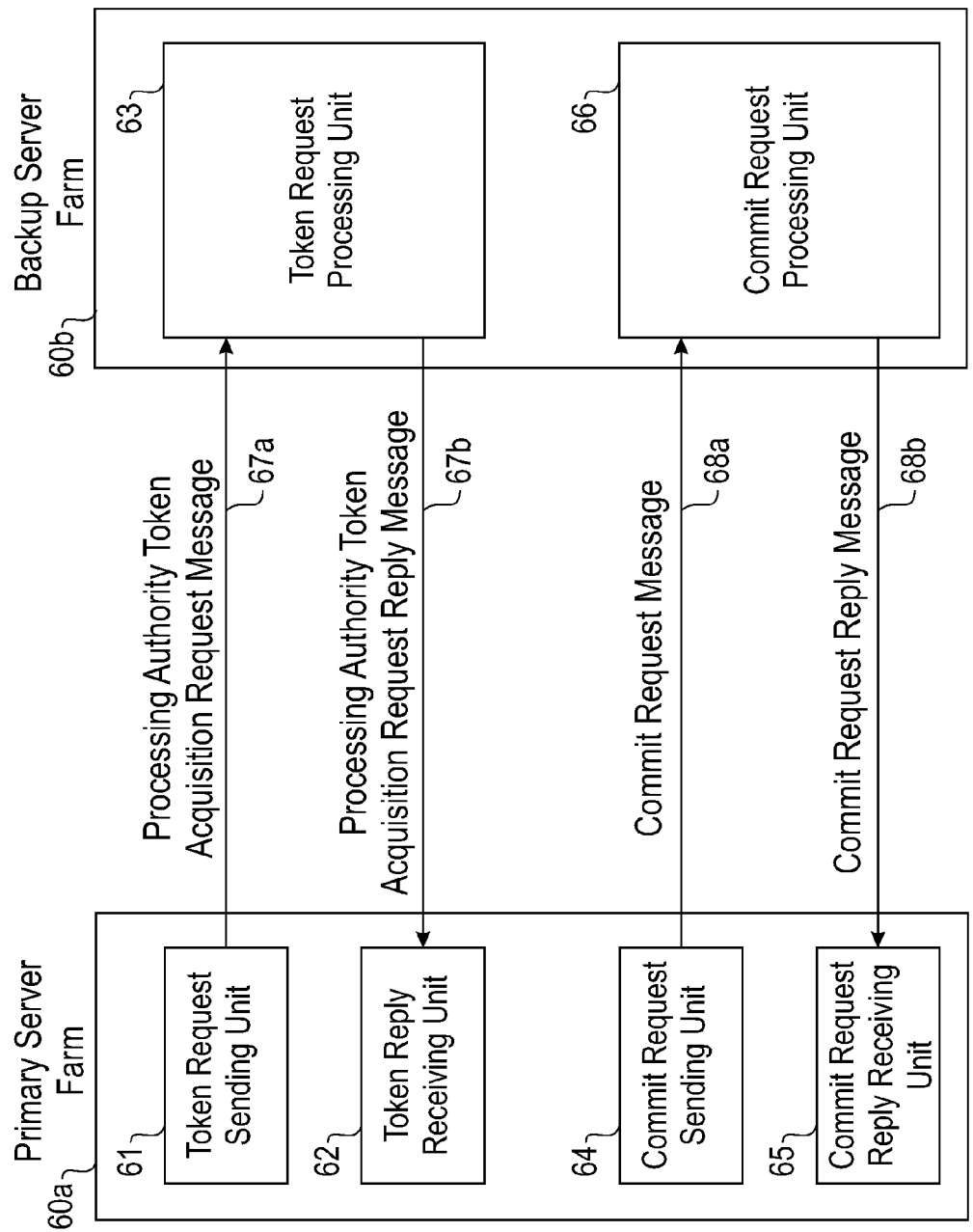
FIG. 6 is a diagram showing a message sending/receiving processing unit of a primary and backup server farms.

FIG. 6 shows message exchange between a server farm at the primary side decided by the transaction redundancy detection unit 51b of FIG. 5 and a server farm at the backup side. The figure shows each of the processing units below which send and receive a message between a primary server farm 60a and a backup server farm 60b.

The primary server farm 60a has a token request sending unit 61 for sending a processing authority token acquisition request message 67a to a backup server farm 60b, a token reply receiving unit for receiving a processing authority token acquisition request reply message 67b to the token acquisition request, a commit request sending unit 64 for sending a commit request message 68a, and a commit request reply receiving unit 65 for receiving a commit request reply message 68b.

The backup server farm 60b has a token request processing unit 63 for receiving a token request message from the primary server farm and sending a reply to the request, and a commit request processing unit 66 for receiving a commit request message.

Details of each of the abovementioned message-sending unit and message-receiving unit will be explained by flowcharts to be described later.

An embodiment of the present invention comprises three parts of a transaction start processing mechanism, a commit control mechanism and a resend token valid period setting mechanism (valid period setting mechanism) from a viewpoint of implementation as shown in FIG. 5.

[1. Transaction Start Processing Mechanism]

The center of the mechanism is a management mechanism of the processing authority token.

The processing authority token is basically a mechanism to ensure that the number of server farms which has the processing authority token is one at a certain time and also ensure that a result of a commit of a transaction to be taken over to the remaining server farms without dropping a result of a commit of a transaction in the entire system even if a failure occurred in a server farm.

Each of the server farms has a single running processing authority token management mechanism. If the mechanism stops, it is considered as a stop of the server farm. A unit to give the processing authority token is given to a data set to be accessed by a certain set of transactions and not accessed by transactions other than those in the set of transactions and any transaction in the set of transactions does not access data other than the data set. Typically, an application unit can be considered.

In the present invention, a keeper deciding method based on a majority rule is used on the processing authority token management. That tells which server farm is currently keeping the processing authority token even if a single server farm stops due to a failure.

A valid period is provided for the processing authority token. That enables another server farm to acquire the processing authority token and to execute the transaction process after a certain time period passes, even if a server farm that is currently keeping the processing authority token stops due to a failure.

TSN (token Serial Number) is given to the processing authority token.

As mentioned above, a LSN (Log Serial Number) is given to a transaction log so that the server farm which kept the previous processing authority token can acquire the transaction log it committed last when it acquires the processing authority token. That enables the committed transaction log to be taken over without being lost.

Processes to acquire the processing authority token will be shown below.

<Processing Authority Token Acquisition Request Message Sending Process 70>

Figure 7:
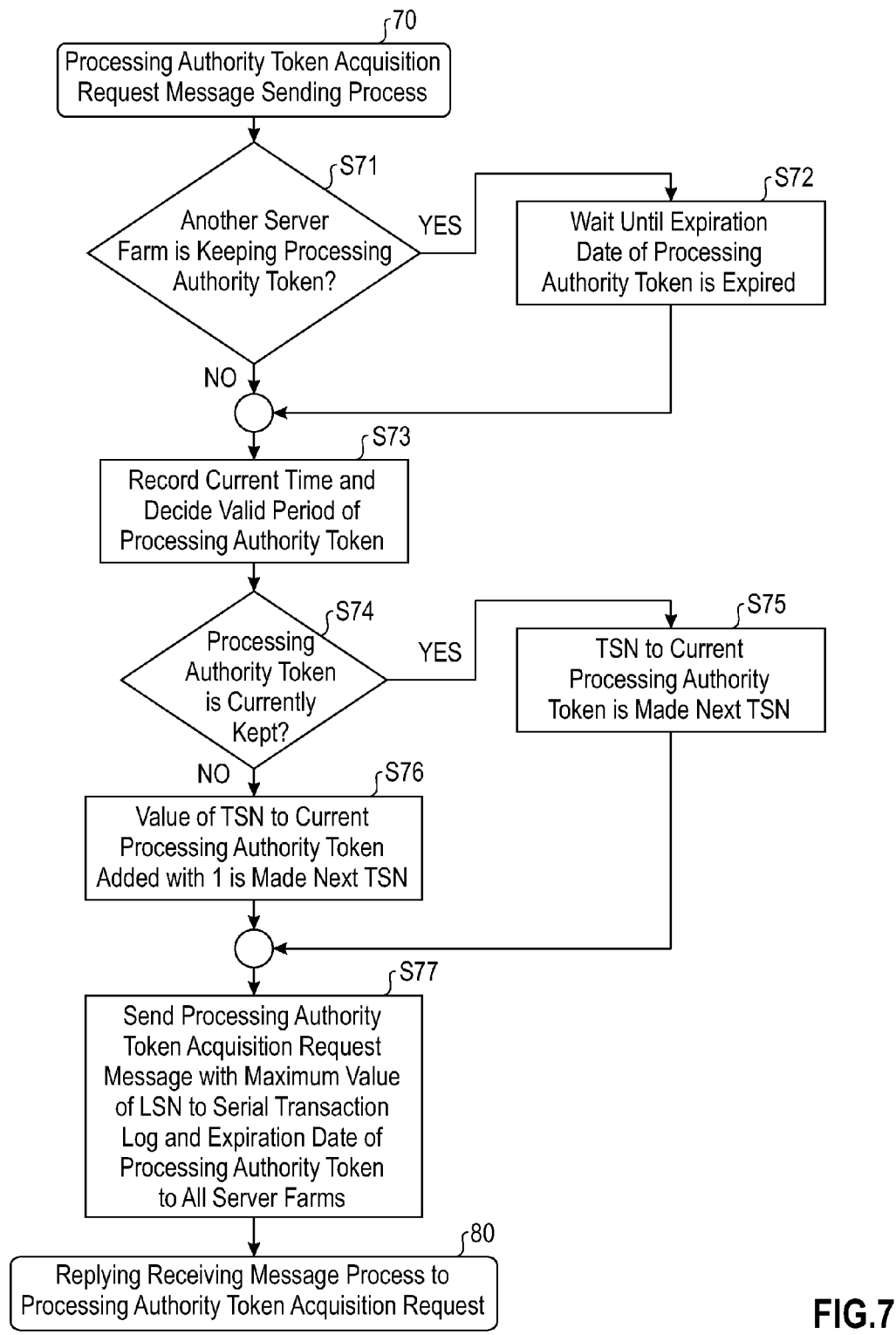
FIG. 7 is a diagram showing a processing flow of token request sending unit 61.

The process is performed by a token request sending unit 61 of FIG. 6. It will be described in detail with reference to the flowchart of FIG. 7.

1) If a record that another server farm is keeping the processing authority token is present (the step S71: Yes), it is waited until the valid period of the processing authority token is expired (the step S72),
2) record the current time, and
3) decide the valid period of the processing authority token (the step S73).
4) The TSN is extracted from the latest processing authority token which is currently recorded in the self server farm, the TSN is decided by the methods below, and the TSN is given as a TSN of the new processing authority token.
   (A) If it is determined that the self server farm kept the processing authority token immediately before, the TSN of the processing authority token is made a new TSN (the step S75).
   (B) If otherwise, the value of the TSN of the processing authority token immediately before added with 1 is made a TSN of the new processing authority token (the step S76).
5) In a set of transaction logs for which a commit or rollback is established in the self server farm and in which the LSN of the transaction log is serial without a drop, the maximum value in the LSN of the transaction logs and the valid period for the processing authority token are given and a processing authority token acquisition request is sent to all the server farms other than itself (the step S77).

Reply Message Receiving Process to the Processing Authority Token Acquisition Request Message 80>

Figure 8:
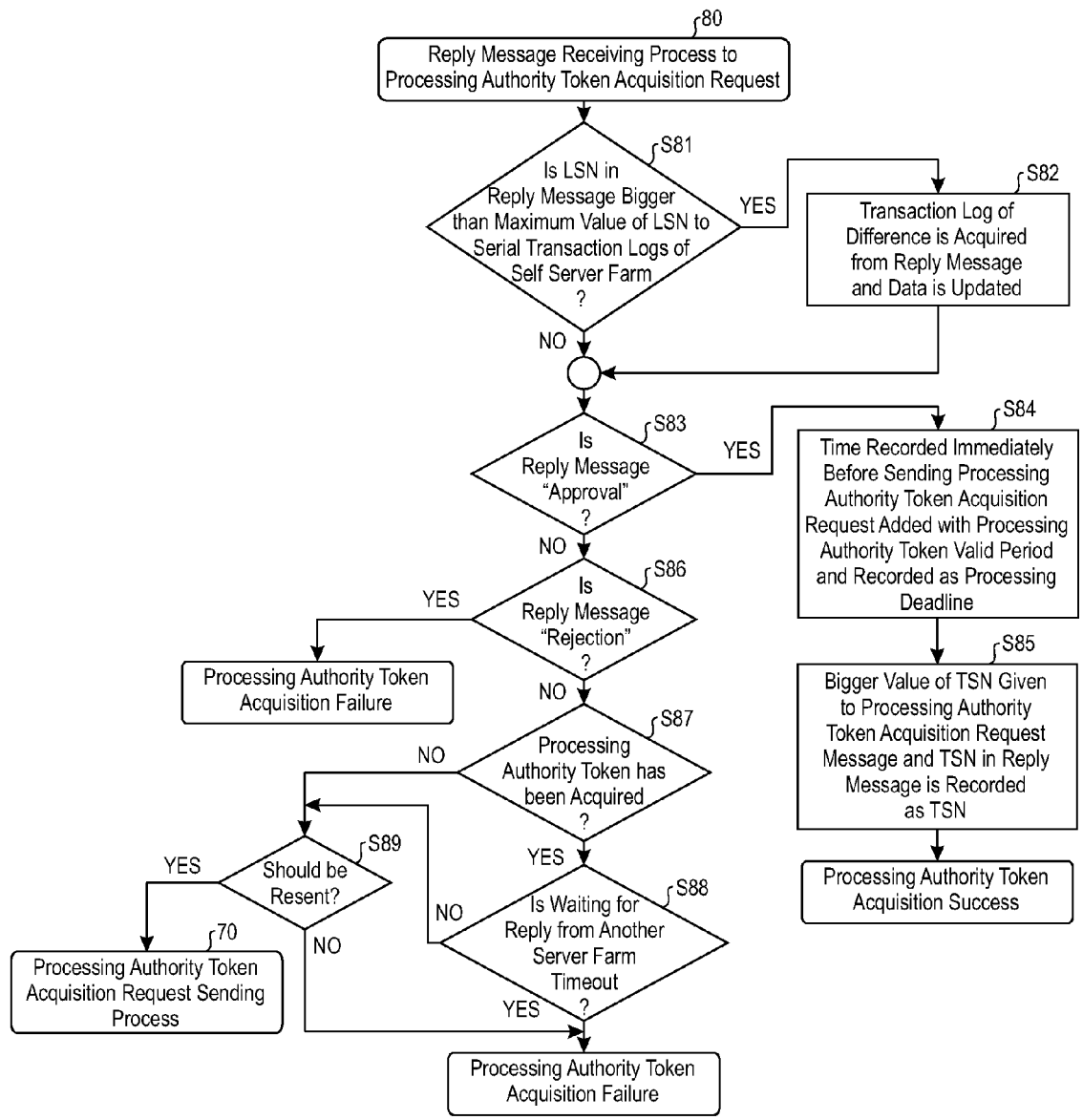
FIG. 8 is a diagram showing a processing flow of token reply receiving unit 62.

The process is performed by the token reply receiving unit 62 of FIG. 6. It will be described in detail with reference to the flowchart of FIG. 8.

6) If the LSN of the transaction logs in the reply message to the received processing authority token acquisition request is bigger than the maximum value of the LSN of the transaction log in a set of transaction logs in which the LSN of the transaction log is serial without a drop in the self server farm (the step S81: Yes), a transaction log of the difference is retrieved from a reply message of the processing authority token acquisition request and data is reflected (the step S82).

7) If the processing authority token acquisition permission is received from one or more server farms (the step S83: Yes), it is considered as the processing authority token acquisition success and a time recorded at the step S73 added with a valid period of the processing authority token is recorded as the expiration time of the processing authority token (the step S84). Further, the TSN of the processing authority token in the reply message is extracted and the bigger value of the value and the value added at the steps S75 and S76 is recorded as the TSN of the processing authority token and the process ends (the step S85).
8) If the processing authority token acquisition rejection is received from two server farms (the step S86: Yes), the processing authority token acquisition is considered as a failure and the process ends.
9) If a resending request is received and the processing authority token has not been acquired yet (the step S87: No), whether it should be resent or not is determined; and if it should be resent (the step S89: Yes), it waits for a certain time period and executes from the step S71 (the step is only reached in the case where a resending request is received).
10) If whether the processing authority acquisition is a success or a failure cannot be decided even after a certain time period (the step S88: No), the processing authority token acquisition is considered as a failure and whether it should be resent or not is determined; and if it should be resent (the step S89: Yes), it is executed again from the step S71 after a certain time period.

An algorithm of a receiving process to the processing authority token acquisition request will be shown below.

<Processing Authority Token Acquisition Request Message Receiving Process 90>

Figure 9:
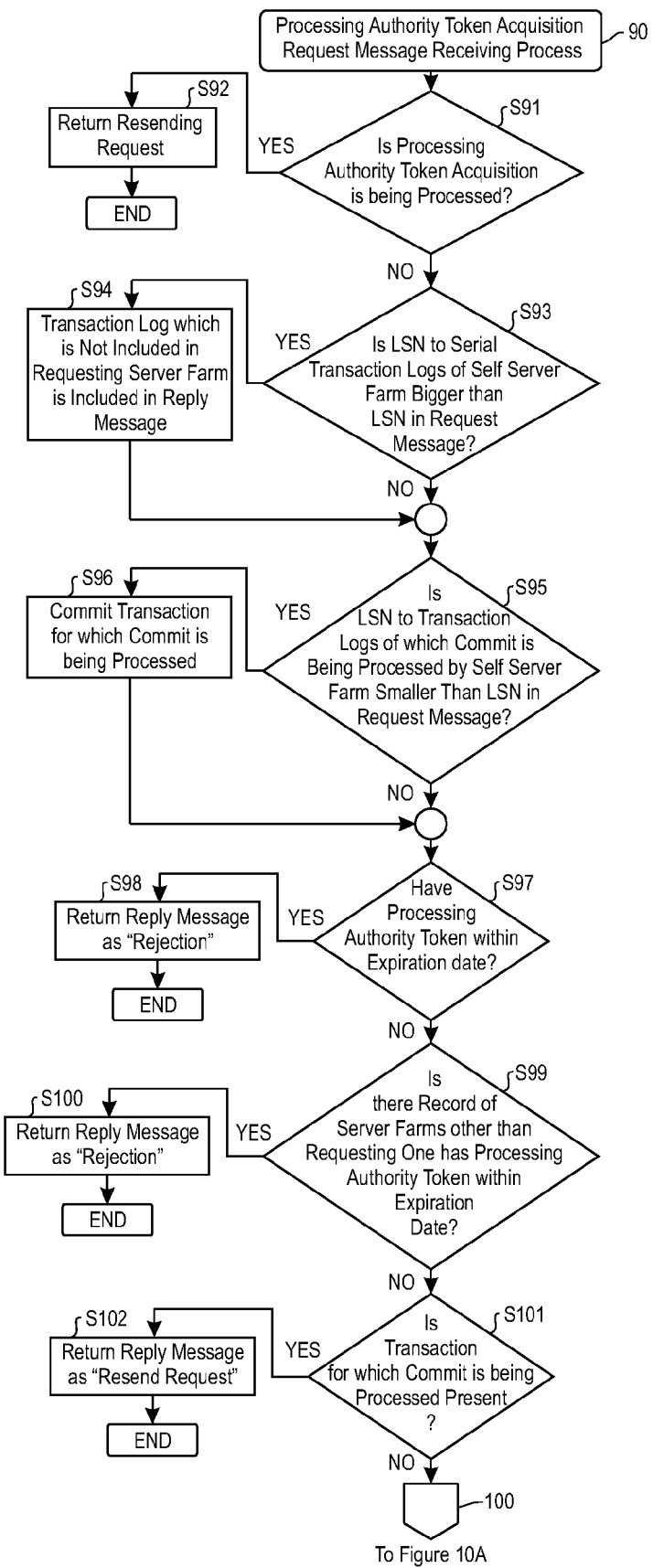
FIG. 9 is a diagram showing a processing flow of token request processing unit 63.
Figure 10:
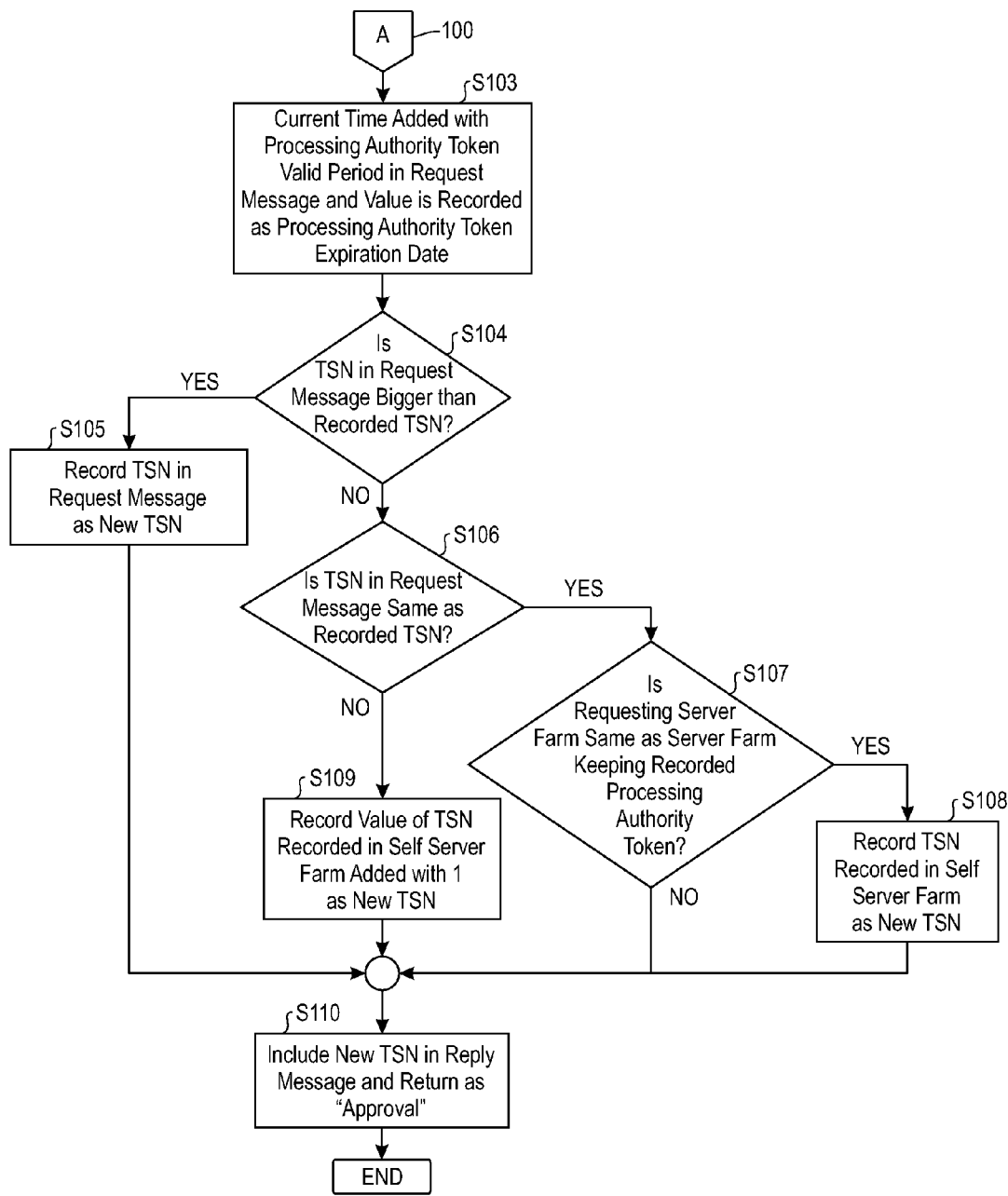
FIG. 10 is a diagram showing a processing flow (continued) of token request processing unit 63.

The process is performed by the token request processing unit 63 of FIG. 6. It will be described in detail with reference to the flowcharts of FIGS. 9 and 10.

11) If the self server farm is processing the processing authority token acquisition (the step S91: Yes), the resending request is returned and the process ends (the step S92).
12) The LSN of the transaction log in a message of the processing authority token acquisition request is compared with the maximum value of the LSN which are serial without a drop among the LSN of the transaction logs kept by the self server farm and the processes below are executed.
 (A) If the LSN of the transaction log in the self server farm is bigger (the step S93: Yes), a transaction log which is not included in the sending server farm is included in a reply message (the step S94).
 (B) If the self server farm has a transaction which is currently processing a commit and the LSN of the transaction log is smaller than the LSN of the received transaction log (the step S95: Yes), the transaction is considered as a commit completed (the step S96).
13) If the self server farm has the processing authority token within an expiration time (the step 97: Yes), the processing authority token acquisition rejection is included in a reply message and returned and the process ends (the step S98).
14) If the self server farm has a record indicating that a server farm other than the sending server farm has the processing authority token within an expiration time (the step S99: Yes), the processing authority token acquisition rejection is included in the reply message and returned and the process ends (the step S100).
15) If the self server farm has a transaction which is processing a commit (the step S101: Yes), a resending request is included in a reply message and returned and the process ends (the step S102).
16) The current time added with a valid period which is given to the processing authority token acquisition request is recorded as an expiration time of the processing authority token, and further the TSN of a new processing authority token is decided by the methods below and the value is recorded (the step S103).
 (A) If the TSN in the received processing authority token acquisition message is bigger than the TSN of the latest processing authority token recorded in the self server farm (the step S104: Yes), the TSN of the received processing authority token acquisition message is made as the TSN of the new processing authority token (the step S105).
 (B) If the TSN in the received processing authority token acquisition message and the TSN of the latest processing authority token recorded in the self server farm are the same, and the sending server farm and the server farm which keeps the latest processing authority token recorded in the self server farm are the same (the step S107: Yes), the value of the TSN of the latest processing authority token recorded in the self server farm is made the TSN of the new processing authority token (the step S108).
 (C) If the abovementioned two are not applied, a value of the TSN of the processing authority token of the self server farm added with 1 is made the TSN of the new processing authority token (the step S109).
17) A processing authority token acquisition approval and the TSN of the processing authority token decided at the steps S103 to S109 are included in a reply message and returned and the process ends (the step S110).

As the processing authority token has a valid period, even if the period is passed and the current processing authority token is expired and the server farm which keeps that becomes a malfunction, the next server farm can acquire the processing authority token.

What important here is that the requesting server farm makes an expiration time of the processing authority token a time before sending the request added with the valid period of the processing authority token, and the server farm received the request makes it a time received the request added with the valid period of the processing authority token. That ensures that the valid period of the current processing authority token has been expired at a time when the processing authority token is expired at the receiving side. That is to say, the other server farms can recognize that the expiration time of the processing authority token has been expired without checking that the server farm currently keeping the processing authority token is alive, and can grant permission to acquisition or the request of acquisition of the next processing authority token.

[2. Commit Control Mechanism]

In the commit process, the transaction log is sent to the other two server farms, and if approval is received from one or more server farms, it is considered as a commit success. As it is assumed that the server farms are three, if the server farm which sent the transaction log and another server farm perform commit approval, a majority of commit approval is acquired, thus, commit approval from one or more server farms can approve the commit as an entire system.

A commit process will be shown below. Here, it is assumed that a transaction ID unique in a system is given to the transaction. Although the algorithms below do not include a returning process to a client, the processing result of the transaction is returned to the client after the commit process completed. At that moment, if a transaction which starts the commit process rolls back but a transaction log which has the same transaction ID is present, the processing result is acquired from the transaction log and returned to the client.

<Commit Request Message Sending Process 110>

Figure 11:
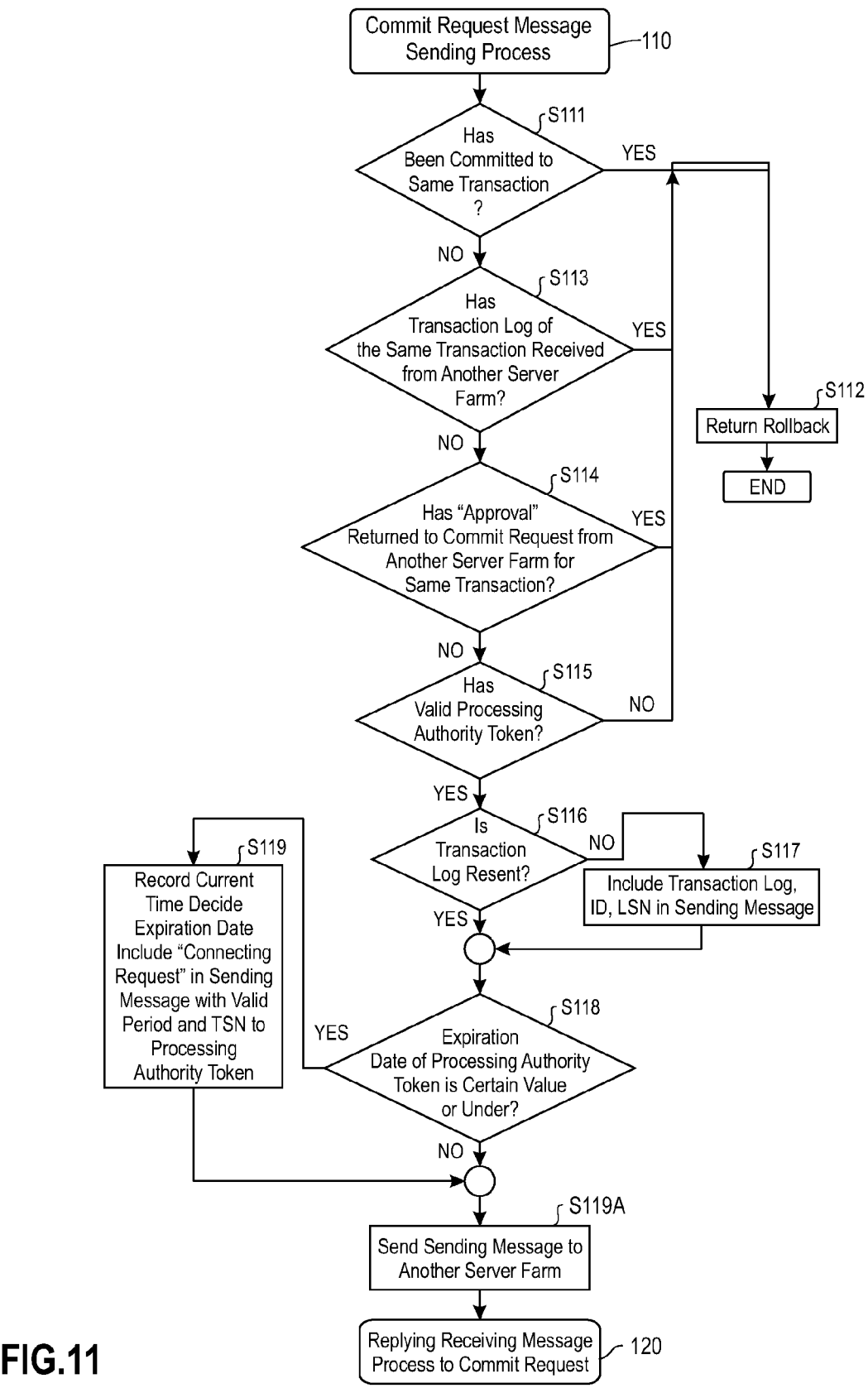
FIG. 11 is a diagram showing a processing flow of a commit request sending unit 64.

The process is performed by the commit request sending unit 64 of FIG. 6. It will be described in detail with reference to the flowchart of FIG. 11.

18) If the commit process has completed to the same transaction in the self server farm (the step S111: Yes), rollback is returned and the process ends (the step S112).
19) If the transaction log for which a commit with the same transaction ID is established has been received from another server farm (the step S113: Yes), or commit approval is returned in the self server farm to the same transaction (the step S114: Yes), rollback is returned and the process ends (the step S112).
20) If a valid processing authority token is not included (the step S115: No), rollback is returned and the process ends (the step S112).
21) If the transaction log is not resent (the step S116: No), the transaction log is included in a sending message with the transaction ID and the LSN of the transaction log (the step S117).
22) If the expiration time of the processing authority token is within a certain time period (the step S118: Yes), the processes below are performed (the step S119).
  (A) Record the current time, and
  (B) decide the valid period.
  (C) Include a processing authority token taking-over request including the valid period and the TSN of the processing authority token in a sending message.
23) The sending message is sent to another server farm (the step S119a).

<Reply Message Receiving Process to the Commit Request 120>

Figure 12:
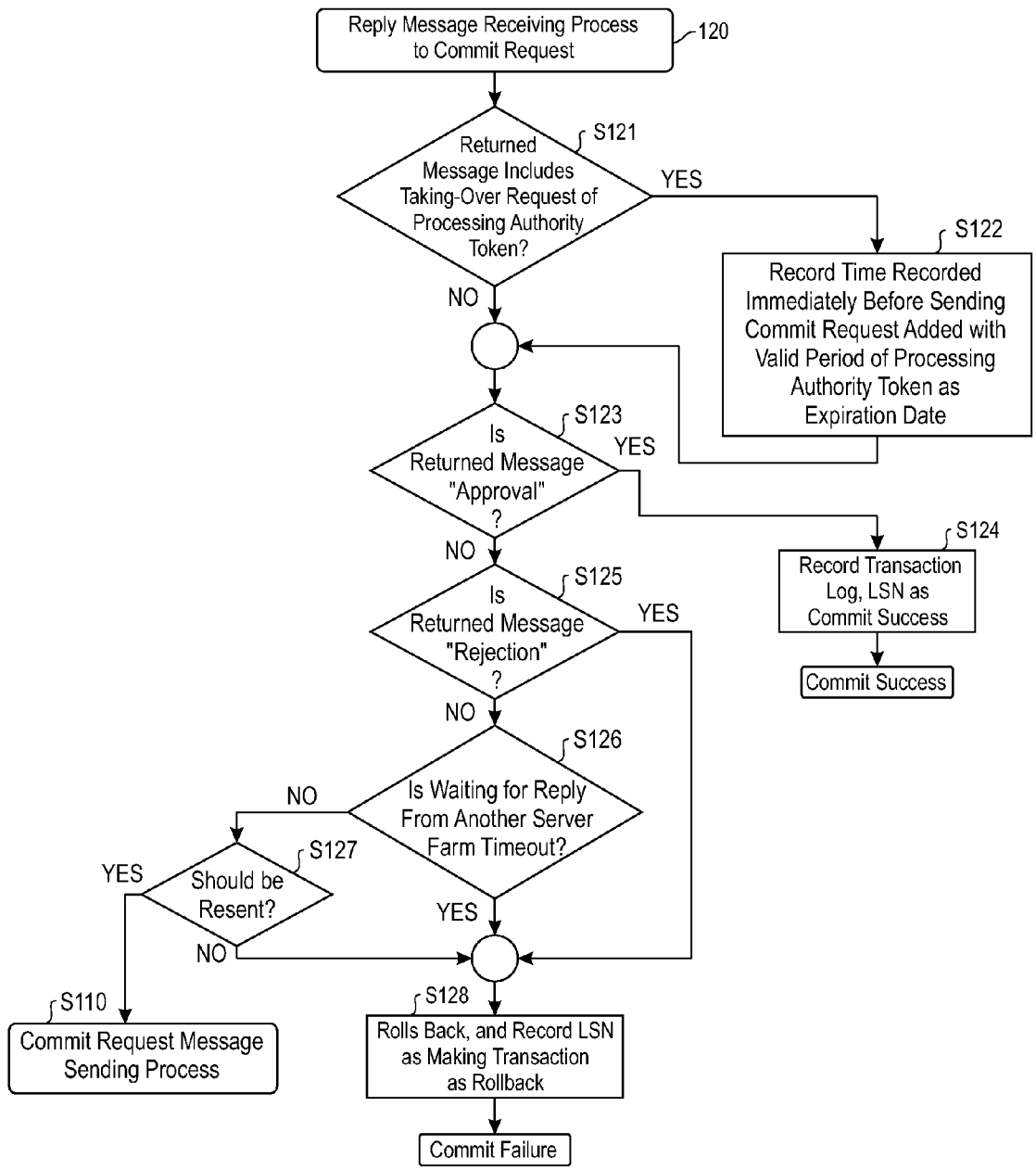
FIG. 12 is a diagram showing a processing flow of a commit request reply receiving unit 65.

The process is performed by the commit request reply receiving unit 65 of FIG. 6. It will be described in detail with reference to the flowchart of FIG. 12.

24) If the returned message includes taking-over approval (the step S121: Yes), a time recorded at the above step S119 added with the expiration time of the processing authority token is made an expiration time and recorded (the step S122).
25) If a reply of commit approval is received from one or more server farms (the step S123: Yes), it is considered as a commit success, and the transaction log and its LSN are recorded and the process ends (the step S124).
26) If a reply of a commit rejection is received from one or more server farms (the step S125: Yes), the LSN of the transaction log is recorded as rollback and the process ends (the step S128).
27) If no reply can be received from any server farms even after a certain time period passed (the step S126: No), whether it should be resent or not is determined, and if it should be resent (the step S127: Yes), it is executed from the step S111 again after a certain time period passed. If otherwise, the LSN of the transaction log is recorded as rollback and the process ends (the step S128).

The processes in the server farm which received the commit process request will be described below.

<Commit Request Message Receiving Process 130>

Figure 13:
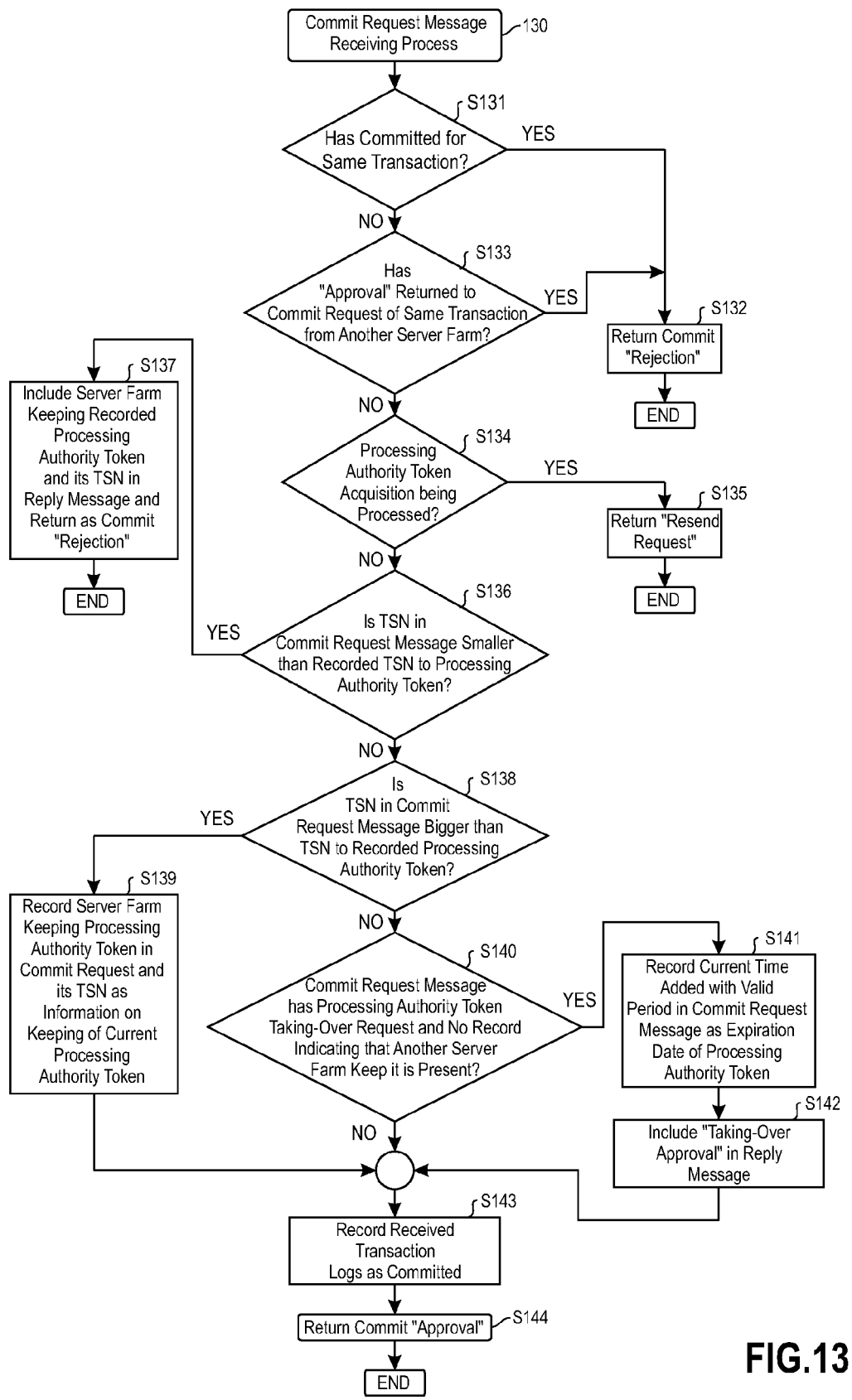
FIG. 13 is a diagram showing a processing flow of a commit request processing unit 66.

The process is performed by the commit request processing unit 66 of FIG. 6. It will be described in detail with reference to the flowchart of FIG. 13.

28) If a commit process of a transaction which has the same transaction ID has been performed at the self server farm (the step S131: Yes), a commit rejection is returned and the process ends (the step S132).
29) If a transaction log which has the same transaction ID has been received from another server farm and commit approval is returned to that (the step S133: Yes), a commit rejection is returned and the process ends (the step S132).
30) If the self server farm is performing the processing authority token acquisition (the step S134: Yes), a request to resend is returned and the process ends (the step S135).
31) If the TSN of the processing authority token in the received message is smaller than the TSN of the processing authority token recorded in the self server farm (the step S136: Yes), the current processing authority token keeping server farm in a record of the self server farm and its TSN are included in a reply message, a commit rejection is returned and the process ends (the step S137).
32) If the TSN of the processing authority token in the received message is bigger than the TSN of the current processing authority token recorded in the self server farm (the step S138: Yes), the current time added with a valid period of the processing authority token in the received message is made an expiration time, and the processing authority token keeping server farm is recorded as a sending server farm of the message (the step S139).
33) If another server farm does not keep the processing authority token (the step S140: Yes), the processes below are performed.
  (A) The current time added with a valid period given to the processing authority token taking-over request is recorded as an expiration time of the processing authority token (the step S141).
  (B) Taking-over approval is included in the returned message (the step S142).
34) The received transaction ID and its transaction log are recorded as commit approval and the commit approval is returned (the steps S143, S144).

[3. Resend Token Valid Period Setting Mechanism]

In the present invention, if a failure occurs in a server farm from the viewpoint of a client, a result of the transaction process needs to be returned in a time too short for the failure to be recognized. Here, "in a time too short for a client to recognize a failure in a server farm" means the maximum response time in a normal occasion defined in a specification of an application. For example, it is such a time as three seconds or so. In order to keep that, timeout duration of the transaction process, a valid period of the processing authority token and a waiting time until resending by the client need to be appropriately set.

An example of that will be shown below.

Now, assuming that the maximum waiting time of the transaction process of the client is T, a valid period of the processing authority token is $T_{to}$, the timeout duration of the transaction process is $T_{tx}$, and a waiting time until resending by the client is $T_{cw}$, the expressions below can be established.

$$T \geq \max(T_{cw}, T_{to}) + T_{tx} \quad \text{(expression 1)}$$

$$T_{cw} > T_{tx} \quad \text{(expression 2)}$$

$$T_{to} > T_{tx} \quad \text{(expression 3)}$$

Further, when resending by the client is performed and is transferred to a server farm which is not a primary one and an expiration time of the primary processing authority token is expired, the expression below is added so that a server farm which received the resending request can acquire the processing authority token.

$$T_{cw} > T_{to} -$$ (expression 4)

$T_{tx}$, $T_{cw}$, and $T_{to}$ only need to be defined to fulfill the (expression 1), (expression 2), (expression 3) and (expression 4). The (expression 4) is not necessary.

For example, assuming that T is 3000 msec, $T_{tx}$ can be set to 1400 msec, $T_{to}$ to 1500 msec, and $T_{cw}$ to 1600 msec.

The valid period setting mechanism may be adapted to let an administrator input such a time value via a dedicated screen, or to calculate and display a value which fulfills the abovementioned expressions on the basis of a given T and let the administrator to further adjust that. The decided time value is sent to each of the sever farms and shared.

Although the present invention has been described by using embodiments and examples, the technical range of the present invention is not limited to a range described in the abovementioned embodiments. The embodiments may be modified or improved variously. It is apparent from the claims that the embodiments with such modifications or improvements may be included in the technical range of the present invention.

The transaction processing method described as an embodiment of the present invention can be realized by a program to cause a system on a computer or a computer to execute the functions. A computer readable recording medium which stores the program may be an electrical, magnetic, optical, electromagnetic, infrared or semiconductor system (or a device or an appliance) or a propagation medium. Examples of a computer readable recording medium include a semiconductor or solid state storing device, a magnetic tape, a removable computer readable diskette, a random access memory (RAM), a read only memory (ROM), a rigid magnetic disk and an optical disk. An example of an optical disk at this moment includes a compact disk read only memory (CD-ROM), a compact disk read/write (CD-R/W) and a DVD.

The invention claimed is:

1. A computer system comprising a plurality of clients and a plurality of server farms connected to a network, each of said plurality of server farms and a self server farm of said plurality of server farms including a database (DB), a DB server including a transaction processing device for managing the database and an application server, the transaction processing device, comprising:
   a memory for storing data from said DB; and
   a processor that:
      sends a processing authority token request by said self server farm to access a database of said plurality of server farms other than said self server farm according to a transaction start request from a client via said application server, if said self server farm does not possess said processing authority token, said processing authority token being time-limited with an expiration time;
      receives replies to said processing authority token request from a majority of said plurality of server farms other than said self server farm authorizing acquisition of said processing authority token by said self server farm;
      sends a commit request including a transaction log to said plurality of server farms other than said self server farm, if said processing authority token is successfully acquired by said self server farm; and
      receives a commit request from a server farm of said plurality of server farms other than said self server farm and replies to said commit request only upon expiration of said expiration time of said process authority token, which has been successfully acquired.

2. The transaction processing device according to the claim 1, further comprising:
   an expiration time setting mechanism for said client to set a transaction resending time which sends a transaction start request and said expiration time for said processing authority token.

3. A computer-implemented method to access a database in a computer system comprising a plurality of clients and a plurality of server farms connected to a network, each of said plurality of server farms and a self server farm of said plurality of server farms including a database (DB), a DB server for managing the database and an application server, the method comprising:
   sending, by a computer, a processing authority token request by said self server farm to access a database of said plurality of server farms other than said self server farm according to a transaction start request from a client via said application server, if said self server farm does not possess said processing authority token, said processing authority token being time-limited with an expiration time;
   receiving, by said computer, replies to said processing authority token request from a majority of said plurality of server farms other than said self server farm authorizing acquisition of said processing authority token by said self server farm;
   sending, by said computer, a commit request including a transaction log to said plurality of server farms other than said self server farm, if said processing authority token is successfully acquired by said self server farm; and
   receiving, by said computer, a commit request from a server farm of said plurality of server farms other than said self server farm and replying to said commit request only upon expiration of said expiration time of said processing authority token, which has been successfully acquired.

4. The method according to claim 3, further comprising: setting, by said computer, a transaction resending time which sends a transaction start request and said expiration time for said processing authority token.

5. A non-transitory storage medium for a computer program readable by a computer system, tangibly embodying a program of instructions executable by said computer system for a method of transaction processing, said computer system comprising a plurality of clients and a plurality of server farms connected to a network, each of said plurality of server farms and a self server farm of said plurality of server farms comprising a database (DB), a DB server for managing the database, and an application server, the method comprising:
   sending a processing authority token request by said self server farm to access a database of said plurality of server farms other than said self server farm according to a transaction start request from a client via said application server, if said self server farm does not possess said processing authority token, said processing authority token being time-limited with an expiration time;
   receiving replies to said processing authority token request from a majority of said plurality of server farms other than said self server farm authorizing acquisition of said processing authority token by said self server farm;

sending a commit request including a transaction log to said plurality of server farms other than said self server farm, if said processing authority token is successfully acquired by said self server farm; and receiving a commit request from a server farm of said plurality of server farms other than said self server farm and replying to said commit request only upon expiration of said expiration time of said processing authority token, which has been successfully acquired.

6. The method stored by the tangible storage medium for the computer program according to claim 5, further comprising: setting a transaction resending time which sends a transaction start request and said expiration time for said processing authority token.

\* \* \* \* \*